United States Patent [19]

Omura

[11] Patent Number: 5,208,874
[45] Date of Patent: May 4, 1993

[54] METHOD FOR CORRECTING IMAGE SIGNAL DETERIORATED BY FLARE AND IMAGE READING UNIT

[75] Inventor: Katsuyuki Omura, Yokohama, Japan
[73] Assignee: Ricoh Company, Ltd., Tokyo, Japan
[21] Appl. No.: 767,378
[22] Filed: Sep. 30, 1991
[30] Foreign Application Priority Data Oct. 12, 1990 [JP] Japan .................................. 2-274558

[51] Int. Cl.$^5$ ........................................... G06K 9/45
[52] U.S. Cl. .................................... 382/54; 382/42; 358/483; 358/447
[58] Field of Search ................... 382/54, 42, 43, 447, 382/461, 475, 482, 483, 484; 250/327.2 F, 327.2 G

[56] References Cited

U.S. PATENT DOCUMENTS

| | | | |
|---|---|---|---|
| 4,728,791 | 3/1988 | Goto | 250/327.2 F |
| 4,806,780 | 2/1989 | Yamamoto et al. | 358/461 |
| 4,891,829 | 1/1990 | Deckman et al. | 378/4 |
| 4,959,736 | 9/1990 | Mino et al. | 358/447 |
| 4,987,450 | 1/1991 | Yamada et al. | 358/447 |
| 5,050,226 | 9/1991 | Collet-Billon | 382/54 |

Primary Examiner—Michael T. Razavi
Assistant Examiner—Steven P. Klocinski
Attorney, Agent, or Firm—Oblon, Spivak, McClelland, Maier & Neustadt

[57] ABSTRACT

A method for correcting image information deteriorated by flare generated in an image reading unit having a light source for irradiating a document, a scanning system optically scanning the document irradiated by the light source and outputting the image information, and a reference image having a predetermined density distribution is provided. The method includes the following steps of: optically scanning the reference image irradiated by the light source, the scanning system outputting reference image information corresponding to the reference image; generating a function denoting a response with respect to the deterioration of the image information caused by the flare based on the reference image information obtained by the scanning system; optically scanning the document irradiated by the light source by the scanning system; and performing a deconvolution operation in which the image information obtained by the scanning system and the above function are used.

8 Claims, 6 Drawing Sheets

FIG. IA PRIOR ART
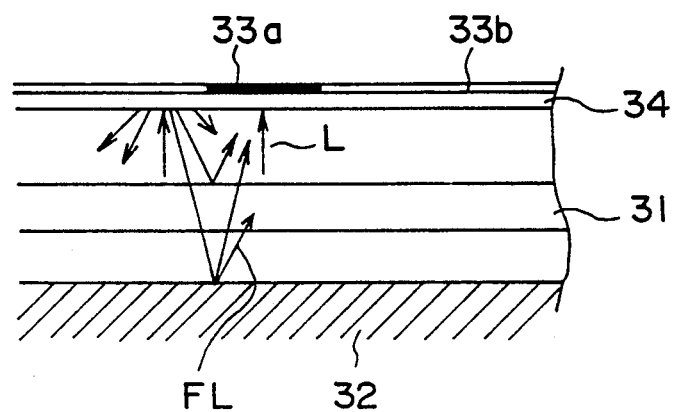
FIG. IB PRIOR ART
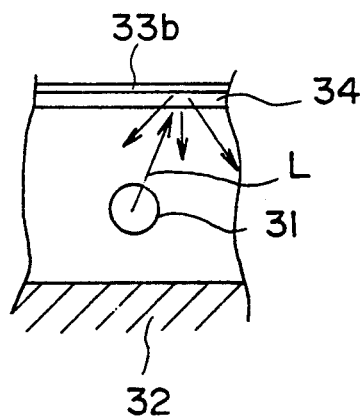

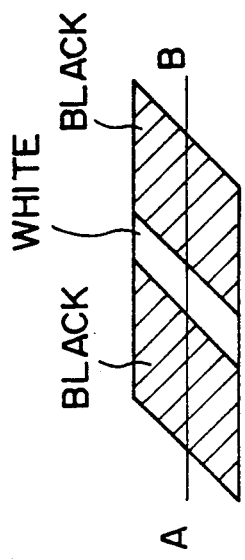
FIG.2A PRIOR ART
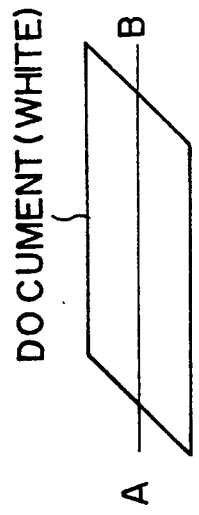
FIG.2C PRIOR ART
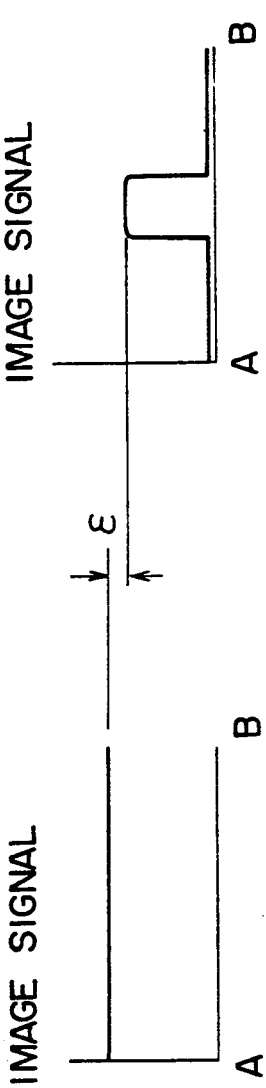
FIG.2B PRIOR ART
FIG.2D PRIOR ART

METHOD FOR CORRECTING IMAGE SIGNAL DETERIORATED BY FLARE AND IMAGE READING UNIT

BACKGROUND OF THE INVENTION

(1) Field of the Invention

The present invention generally relates to a method for correcting an image signal deteriorated by flare and an image reading unit, and more particularly to a method for correcting an image signal deteriorated by flare and an image reading unit in which a high quality image can be obtained. The method for correcting an image signal and the image reading unit according to the present invention can be applied to copy machines, optical scanners and facsimile machines.

(2) Description of Related Art

Flare can be generated in an image reading unit, as shown in FIGS. 1A and 1B. FIG. 1A is a vertical cross sectional view of a mechanism in which a document is irradiated by a light source, and FIG. 1B is a transverse cross sectional view thereof. Referring to FIGS. 1A and 1B, a document 33 is placed on a contact glass 34. A light source 31 is provided between a frame 32 and the contact glass 34. A fluorescent lamp extending in a main scanning direction is, for example, used as the light source 31. The document 33 includes a black part 33a corresponding to a visual image and a white part 33b corresponding to a background of the document 33. The light source 31 emits light rays in any directions, so that some parts of the light rays, which are reflected by the surface of the document 33, are reflected again by the frame 32 and the surface of the light source 31. Thus the light rays which are reflected by the frame 32 and the surface of the light source 31 can be reprojected onto the surface of the document 33. Light rays which are reflected a plurality of times between the frame 32 and the document 33 placed on the contact glass 34, as described above, are often referred to as flare. That is, flare refers to light rays incident via optical paths other than a primary path to the document 34. When image signals detected at an area are affected by the flare caused by reflected light rays on a surrounding area thereof, a MTF (Modulation Transfer Function) of an image reproduced based on the image signals deteriorates. Thus, in this case, a high quality image can not be obtained. The MTF can describe a degree of sharpness of an image.

Flare affects the image signal as in the following manner.

When a document having a white solid image is scanned on a main scanning line A-B, as shown in FIG. 2A, an image signal as shown in FIG. 2B is obtained by the image reading unit. On the other hand, when a document having a white line formed on a black background is scanned on the main scanning line A-B, as shown in FIG. 2C, an image signal as shown in FIG. 2D is obtained. Even if a density of the white solid image in a case shown in FIG. 2A is equal to that of the white line in a case shown in FIG. 2C, the level of the image signal obtained as shown in FIG. 2B is greater by $\epsilon$ than the level of the image signal corresponding to the white line obtained as shown in FIG. 2D. The amount of flare caused by the black background surrounding the white line (see FIG. 2B) is less than the amount of flare caused by the white image because a reflectivity of the black background is less than that of the white image. Thus, the above difference between the image signals shown in FIGS. 2B and 2D is generated.

Conventionally, to decrease the amount of flare affecting the image signal as has been described above, a light source, for example, disclosed in Japanese Patent Laid Open Publication No. 1-182864 has been proposed, the light source being used in an image reading unit.

In a case where a light source 44 having a lamp tube 42, such as a fluorescent lamp tube, and a reflector 43, is placed under a support glass 41, light rays emitted from the light source 44 are diffused in any direction as shown in FIG. 3. According to the prior art disclosed in Japanese Patent Laid Open Publication No. 1-182864, the amount of flare is decreased by decreasing a degree of diffusion of the light rays emitted from the light source, as shown in FIGS. 4A and 4B.

Referring to FIGS. 4A and 4B, a light source 53 has a lamp tube 48 and a reflector 49. Each side end of the reflector 49 is provided with plates 50 and the inside of the reflector 49 is partitioned into plurality of areas by partition plates 51. Due to the above structure of the light source 53, some of the light rays diffused from the lamp tube 48 are interrupted by the partition plates 51. That is, some of the light rays are reflected by surfaces 51a and 51b of each of the partition plates 51, so that the light rays reflected thereby do not reach a document placed on a support glass 52. As a result, the degree of diffusion of the light rays emitted from the light source 53 is decreased as shown in FIG. 4A.

When the degree of diffusion of the light rays emitted from the light source is decreased, the amount of flare applied to each point on the document is also decreased. That is, the amount of flare affecting the image signal obtained at each point on the document is reduced to a small amount.

In the above prior art, to definitely decrease the flare, the number of partition plates 51 must be increased and an end of each of the partition plates 51 must be brought close to the support glass 52. However, when the number of partition plates 51 is increased and the end of each of the partition plates 51 is brought close to the support glass 52, the surface of the document can not be uniformly irradiated by the light rays. In addition, the amount of light projected onto the surface of the document is also decreased. As a result, a high quality image cannot be obtained.

SUMMARY OF THE INVENTION

Accordingly, a general object of the present invention is to provide a novel and useful method for correcting an image signal deteriorated by flare and an image reading unit in which the disadvantages of the aforementioned prior art are eliminated.

A more specific object of the present invention is to provide a method for correcting an image signal deteriorated by flare and an image reading unit in which a high quality image can be obtained even if the flare is incident to the surface of a document.

The above objects of the present invention are achieved by a method for correcting image information deteriorated by flare generated in an image reading unit having a light source for irradiating a document, a scanning system for optically scanning the document irradiated by the light source and outputting the image information, and a reference image having a predetermined density distribution, the method comprising the following steps (a) through (d) of: (a) optically scanning, by the scanning system, the reference image irradiated by the light source, the scanning system outputting reference image information corresponding to the reference image; (b) generating a function denoting a response with respect to the deterioration of the image information caused by the flare based on the reference image information obtained by the scanning system in the step (a); (c) optically scanning the document irradiated by the light source by the scanning system; and (d) performing a deconvolution operation in which the image information obtained by the scanning system in the step (c) and the function generated by the step (b) are used, wherein a result obtained by the step (d) is used as corrected image information.

The above objects of the present invention are also achieved by an image reading unit comprising: a light source for irradiating a document; a scanning system for optically scanning the document irradiated by the light source and outputting the image information; a reference image having a predetermined density distribution; generating means for generating a function denoting a response with respect to deterioration of the image information caused by flare based on reference image information which is obtained when the scanning system optically scans the reference image irradiated by the light source; and deconvolution means for performing a deconvolution operation in which the image information which is obtained when the scanning system optically scans the document irradiated by the light source and the function generated by the generating means are used, wherein a result obtained by the deconvolution means is used as corrected image information.

According to the present invention, an operation for correcting the image information is performed based on the reference image information which is obtained when the scanning system optically scans the reference image. That is, as in the present invention the image information is directly corrected, image information having less deterioration caused by flaring than in the above conventional case can be obtained. In addition, as the function denoting the response with respect to the deterioration of the image information is generated based on the reference image data which is obtained when the reference image is scanned, an operation for obtaining the function can be easily performed. Furthermore, as the reference image and the document are respectively irradiated by the same light source, even if the amount of the light emitted from the light source varies, a relationship between the image information of the document and the reference image information does not change. Thus, the image information can be stably corrected.

Additional objects, features and advantages of the present invention will become apparent from the following detailed description when read in conjunction with the accompanying drawings.

BRIEF DESCRIPTION OF THE DRAWINGS

FIG. 1A is a vertical cross sectional view showing a mechanism in which a document is irradiated by light rays emitted from a light source.

FIG. 1B is a transverse cross sectional view showing the mechanism shown in FIG. 1A.

FIG. 2A is a diagram illustrating a document having a white solid image.

FIG. 2B is a diagram illustrating an image signal corresponding to the white solid image shown in FIG. 2A.

FIG. 2C is a diagram illustrating a document having an image in which a white line is formed on a black background.

FIG. 2D is a diagram illustrating an image signal corresponding to the image shown in FIG. 2C.

DESCRIPTION OF THE PREFERRED EMBODIMENTS

A description will now be given of the principle of the present invention with reference to FIGS. 5, 6A, 6B, and 6C.

Figure 3:
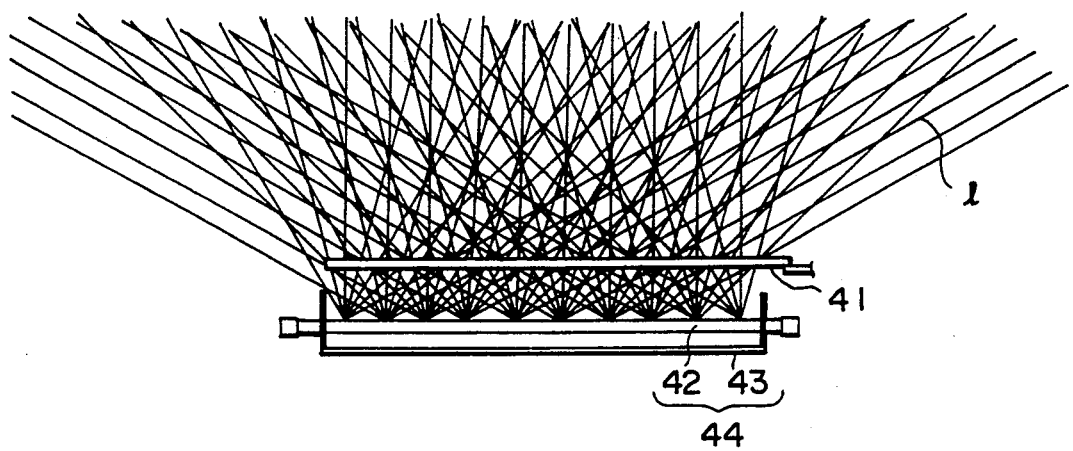
FIG. 3 is a diagram illustrating a state in which light rays are diffused from a light source.
Figure 4A:
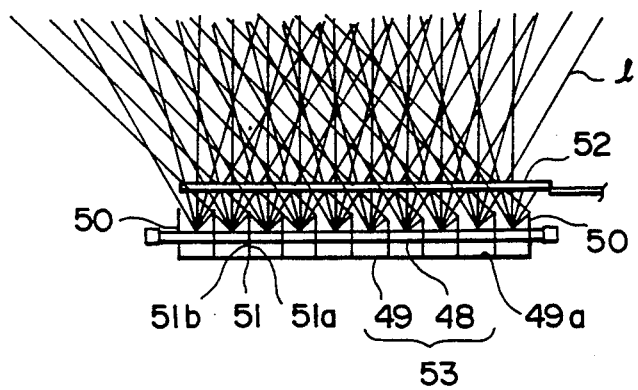
FIG. 4A is a diagram illustrating a state in which light rays are diffused from a light source having a plurality of partition plates.
Figure 4B:
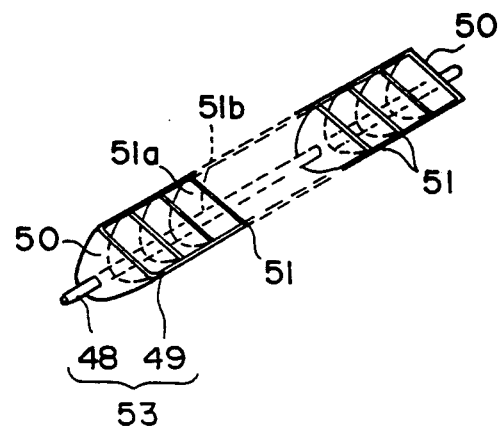
FIG. 4B is a diagram illustrating a light source having a plurality of partition plates.
Figure 5:
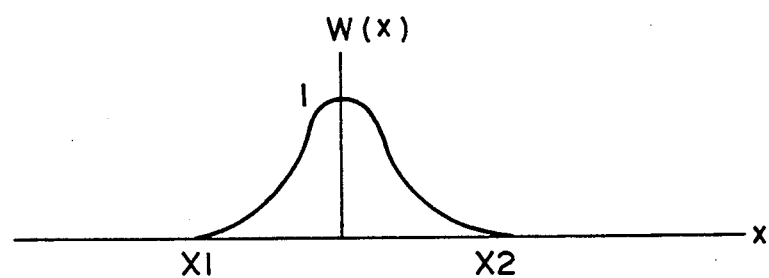
FIG. 5 is a diagram illustrating a function denoting a rate at which a density of each point affects an image signal at a specified point.

When flare is generated in the optical reading unit as shown in FIGS. 1A and 1B, the image signal at a specified point on the document is affected by densities of points surrounding the point being considered, as shown in FIGS. 2A through 2D. That is, a rate at which the density of each of the points surrounding the specified point affects the image signal at the specified point can be denoted by a function $w(x)$ having a predetermined distribution, where x is a distance between the specified point and each of the points on the document. The smaller the distance between the specified point and each of the points surrounding it, the greater the rate at which the density of each of the points affects the image signal at the specified point. The function $w(x)$ having a distribution, for example, shown in FIG. 5, can be used. In FIG. 5, the rate at which the density of points affects a image signal at the specified point is defined by the function $w(x)$ illustrated in the figure. In this case, the image signal $S_{out}(x)$ at the point ($x=0$) being considered can be denoted by the following formula (1):

$$S_{out}(x) = \int_{x_1}^{x_2} S(\tau - x) w(\tau) d\tau \quad (1)$$

where $S(x)$ is an image signal which should be obtained at a point x under a condition in which there is no flare, and $w(x)$ is the function describing a rate at which the density of each of the points affects the image signal a the point being considered. In the above formula (1), the image signal is denoted by a one dimensional signal for simplicity. A range of the integral calculation in the above formula (1) is limited to a range of $x_1-x_2$. However, the integral calculation in accordance with the above formula (1) generally corresponds to a convolution integral calculation. That is, the image signal $S_{out}$ is denoted by the following formula (2):

$$S_{out}(x) = S(x) * w(x) \quad (2)$$

where * is a convolution operator. If the function w(x) has been previously defined, the image signal $S_{out}$ deteriorated by flare can be corrected by a deconvolution operation. That is, the corrected image signal S(x) at each point can be calculated in accordance with the deconvolution operation in which the image signal $S_{out}(x)$ actually detected by the image reading unit and the function w(x) are used. The function w(x) is a response to the image signal at one specified point. That is, the function w(x) is an impulse response to the MTF deterioration caused by the flare generated in the image reading unit. Thus a fourier-transform of the function w(x) can be regarded as a transfer function of a system in which the MTF is deteriorated.

A description will now be given of how the transfer function is obtained.

When images each having a high reflectivity (white images) are close to the specified point, the image signal at this point is deteriorated by flare, as has been described above. That is, the images surrounding the specified point affect the image signal at the specified point so that the MTF is deteriorated.

Figure 6A:
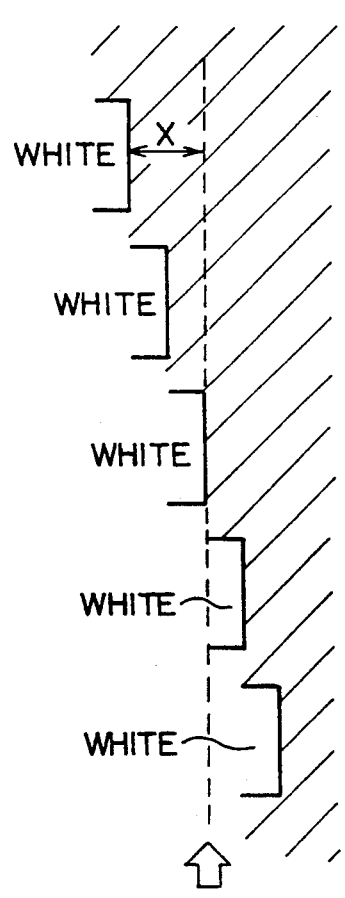
FIGS. 6A, 6B and 6C are diagrams illustrating a variation of the image signal at the specified point when a white image is brought close to the specified point.
Figure 6B:
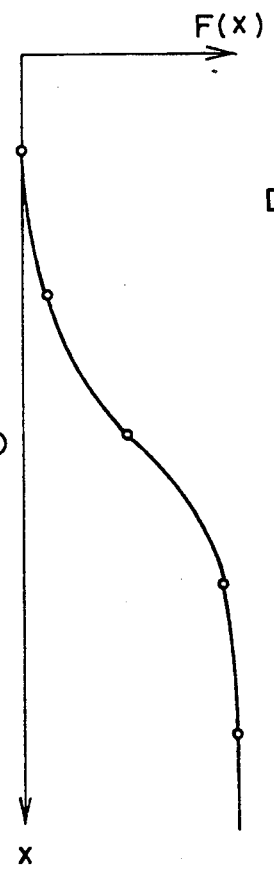

The specified point is defined as a point on a black solid image. An image signal at the specified point is detected while a white image is being brought close to the objective point. In this case, the image signal at the specified point varies so that the closer the white image is to the point, the higher the level of the image signal at the point, as shown in FIGS. 6A and 6B. In FIGS. 6A and 6B, the one dimensional image data is considered for the sake of simplicity, and the specified point is defined as x=0. When an extremely small white area having a width of dx is placed at a position separated by x from the specified point, the amount dF of affect (the amount of flare) of the extremely small white area on the point being considered is denoted by the following formula (3):

$$dF = f(x) \cdot dx \quad (3)$$

where f(x) is a function denoting a rate at which a unit white area separated by x from the specified point affects the image signal at the specified point. A variation of the image signal at the specified point which is obtained when the image is brought close to the specified point, as shown in FIG. 6B, corresponds to a function F in the above formula (3). In addition, the function w(x) corresponds to the function f(x) in the formula (3). Thus, according to the formula (3), when the function F which has been measured as shown in FIGS. 6A and 6B is differentiated by x, the function f(x) is obtained. That is, the function w(x) is obtained.

In a case where variation of sensitivities of optical elements in an optical sensor for scanning the document is much less than the value of the function F, the function F can be effectively measured in accordance with the following procedure.

Figure 6C:
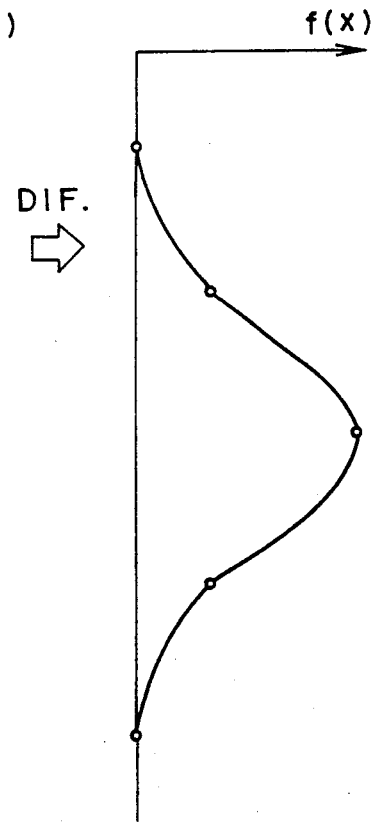
Figure 7:
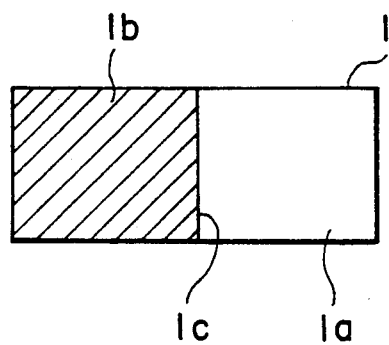
FIG. 7 is a diagram illustrating an example of a reference image.

The function F shown in FIG. 6B can be regarded as being approximately equivalent to an image profile which is obtained when a reference chart 1 which is divided into a white region 1a and a black region 1b is scanned by the optical sensor in a direction A-B shown in FIG. 7. The border 1c between the white region 1a and the black region 1b corresponds to the specified point (x=0). Thus, when the image profile of the reference chart 1 is differentiated in space, a function having a distribution shown in FIG. 6C is obtained. This function corresponds to the function representing the rate at which the density of the points affects the image signal at the specified point (x=0). That is, this function can be regarded as being an impulse response which is obtained when a white spot image is brought close to the black image.

The image signal detected by the optical sensor is corrected in accordance with the deconvolution operation in which the function which has been obtained based on the image profile of the reference chart shown in FIG. 7 is applied to the detected image signal, so that the MTF is recovered.

A description will now be given of an image reading unit according to an embodiment of the present invention with reference to FIGS. 8 and 9.

Figure 8:
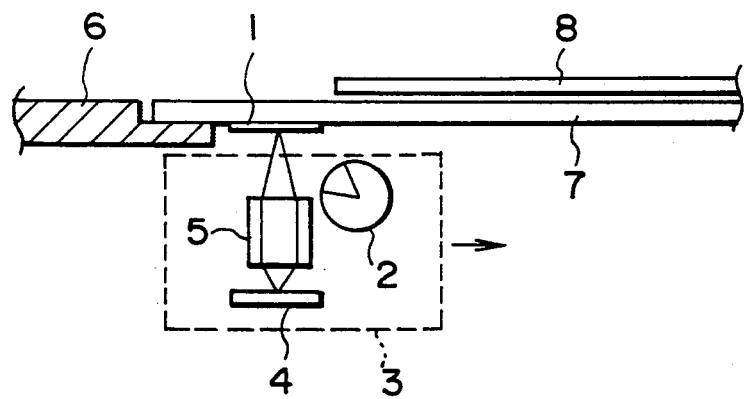
FIG. 8 is a diagram illustrating essential parts of an image reading unit according to an embodiment of the present invention.

Referring to FIG. 8, which shows a mechanism for scanning a document on which an image is formed, a contact glass 7 is mounted on a frame 6. A document 8 is set on a surface of the contact glass 7. A reading assembly 3 is provided under the contact glass 7 so as to be moved in a sub scanning direction shown by an arrow in FIG. 8. The reading assembly 3 has a light source 2, such as a fluorescent lamp, an optical system 5 and an optical sensor 4. The light source 2 irradiates the document 8 via the contact glass 7. The optical sensor 4 has a plurality of photoelectric conversion elements arranged in a main scanning line perpendicular to the sub scanning direction. An image irradiated by the light source 2 is projected, via the optical system 5, onto the surface of the optical sensor 4. A reference chart 1 which is divided into the white region and the black region as shown in FIG. 7 is fixed at an end portion thereof on the rear surface of the contact glass 7. As the reference chart 1 has the white region and the black region, the density distribution of the reference chart 1 is a step function of black and white.

Before a process for reading an image starts, the reading assembly 3 is positioned under the frame 6. When an instruction for reading an image is supplied to the reading assembly 3, the reading assembly 3 moves in a main scanning direction and optically scans the reference chart 1 in the direction A-B as shown in FIG. 7. After this, the reading assembly 3 optically scans the document 8 set on the contact glass 7.

Figure 9:
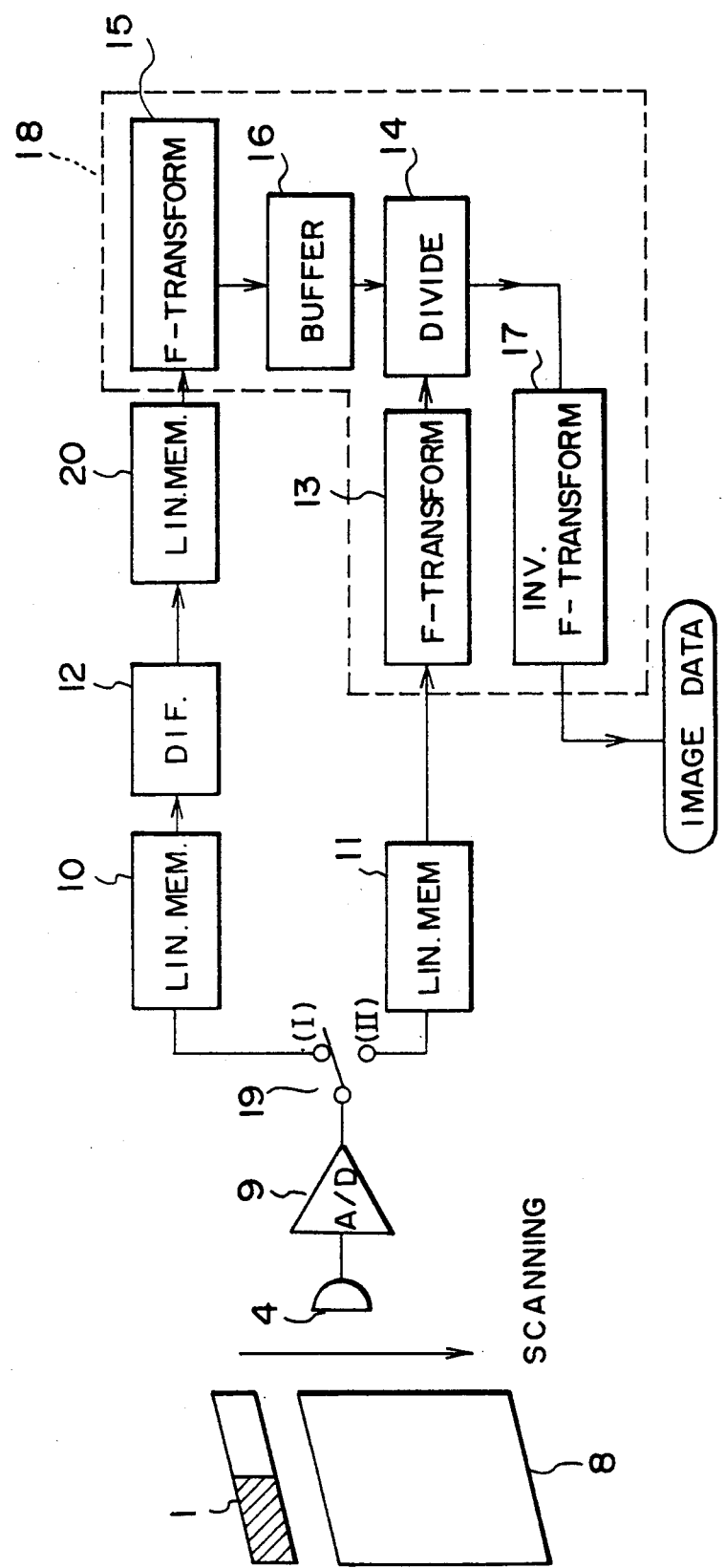
FIG. 9 is a block diagram illustrating a signal processing system in the image reading unit according to the embodiment of the present invention.

Referring to FIG. 9, which shows a processing system in the image reading unit, an analog to digital converter 9 converts an image signal supplied from the optical sensor 4 into digital image data. The analog to digital converter 9 is connected to a switch 19 having a first terminal (I) and a second terminal (II). A first line memory 10 is connected to the first terminal (I) of the switch 19. The first line memory 10 can store image data for one line. A differentiator 12 is connected to the first line memory 10 so that the image data for one line stored in the line memory is differentiated b the differentiator 12. The differentiator 12 outputs function data obtained by differentiating the image data for one line. A second line memory 20 is connected to the differentiator 12. The second line memory stores the function data output from the differentiator 12. A third line memory 11 is connected to the second terminal (II) of the switch 19. Image data for one line output from the analog to digital converter 9 is supplied via the switch 19 to the third line memory 11 and stored therein. The second line memory 20 and the third line memory 11 are respectively connected to a deconvolution unit 18.

The convolution integral calculation can be converted into a multiplication calculation by using the fourier-transform operation. That is, when the above formula (2) stands, the following formula (4) can stand.

$$S_{out}'(x) = S'(x) \times w'(x) \quad (4)$$

where $S_{out}'(x)$ is a fourier-transformed result of the $S_{out}(x)$, $S'(x)$ is a fourier-transformed result of the $S(x)$, and $w'(x)$ is a fourier-transformed result of the $w(x)$. Thus, $S'(x)$ is obtained by a calculation in accordance with the following formula (5)

$$S'(x) = S_{out}'(x)/w'(x) \quad (5)$$

Then when the inverse fourier-transform of $S'(x)$ calculated by the above formula (5) is performed, the original $S(x)$ is obtained.

$S(x)$ in the above formula (2) representing the convolution integral calculation is generally obtained by the deconvolution operation. Thus, the above process including the fourier-transform operation, the division calculation in accordance with the formula (5) and the inverse fourier-transform operation can be regarded as being the deconvolution operation.

The deconvolution unit 18 shown in FIG. 9 has a first fourier-transform circuit 15, a buffer 16, a second fourier-transform circuit 13, a division circuit 14 and a inverse fourier-transform circuit 17 so as to perform the above process including the fourier-transform, the division and the inverse fourier-transform.

When the reading assembly 3 optically scans the reference chart 1, the switch 19 selects the first terminal (I). Thus, the image data corresponding to the step function of white and black is stored in the first line memory 10, this being equivalent to the function F shown in FIG. 6B. The image data stored in the first line memory 10 is differentiated by the differentiator 12, so that the function data equivalent to the function f(x) shown in FIG. 6C is stored in the second line memory 20. The function data stored in the second line memory 20 is supplied to the fourier-transform circuit 15 of the deconvolution unit 18 and fourier-transformed thereby. The fourier transform of the function data f(x) is stored in the buffer 16. That is, the fourier transform equivalent to w'(t) in the formula (4) is stored in the buffer 16.

When the reading assembly 3 optically scans the document, the switch 19 selects the second terminal (II). Thus, the image data for one line on the document is stored in the third memory 11. The image data is equivalent to the image data $S_{out}(x)$ in the formula (2). The image data stored in the third line memory 11 is supplied to the fourier-transform circuit 13 of the deconvolution unit 18 and fourier-transformed thereby. That is, the fourier transform circuit 13 outputs the fourier-transform of the image data which is equivalent to $S_{out}'(x)$ in the formula (4). The division circuit 14 divides the fourier-transform of the image data by the fourier-transform of the function data stored in the buffer 16. That is, the division circuit 14 carries out the above division calculation in accordance with the above formula (5). Thus, the division circuit 14 outputs data corresponding to $S'(x)$ in the formula (5). Then the data output from the division circuit 14 is inverse fourier-transformed by the inverse fourier transform circuit 17. The output data from the inverse fourier-transform circuit 17 is equivalent to the image data S(x) in the above formula (2), so that the image data which should be detected under a condition in which there is no flare in the image reading unit is output from the deconvolution unit 18. The image data output from the deconvolution unit 18 is supplied, for example, to an external image process unit.

The above process in the deconvolution unit 18 is equivalent to a process for applying a spacial frequency filter to the image data in a spacial frequency region. Thus, the deconvolution unit 18 can also have an adaptive digital filter.

The present invention is not limited to the aforementioned embodiment, and variations and modifications may be made without departing from the scope of the claimed invention.

What is claimed is:

1. A method for correcting image information deteriorated by flare generated in an image reading unit having a light source for irradiating a document, a scanning system for optically scanning the document irradiated by said light source line by line and outputting the image information, and a reference image having a step shaped density distribution in a direction parallel to each scanning line of said scanning system, said method comprising the following steps (a) through (d) of:
    (a) optically scanning, with said scanning system, the reference image having a step shaped density distribution irradiated by said light source, and said scanning system outputting reference image information corresponding to the reference image;
    (b) generating a function representing an effect surrounding points have on the density of a specified point, said effect being caused by the flare, using the reference image information obtained by said scanning system in said step (a);
    (c) optically scanning the document irradiated by said light source with said scanning system, such that said scanning system outputs image information of the document; and
    (d) performing a deconvolution operation in which the image information of the document outputted by said scanning system in said step (c) and the function generated by said step (b) are used to calculate corrected image information of the document.

2. A method as claimed in claim 1, wherein said reference image having a stepped shaped density has a white region and a black region connected to the white region.

3. A method as claimed in claim 1, wherein said step (b) comprises a step of differentiating, in space, the reference image information obtained in said step (a).

4. A method as claimed in claim 1, wherein said step (d) comprises the following steps (d-1) through (d-4) of:
    (d-1) fourier-transforming the function obtained in said step (b);
    (d-2) fourier-transforming the image information of the document obtained in said step (c);
    (d-3) dividing a result obtained in said step (d-2) by a result obtained in said step (d-1); and
    (d-4) inverse fourier-transforming a result obtained in said step (d-3) to obtain the corrected image information of the document.

5. An image reading unit comprising:
    a light source for irradiating a document;

a scanning system for optically scanning the document irradiated by said light source line by line and outputting image information of the document;

a reference image having a step shaped density distribution in a direction parallel to scanning lines of said scanning system;

generating means for generating a function, which represents an effect surrounding points have on a density of a specified point, said effect being caused by flare, using reference image information obtained by using said scanning system to optically scan said reference image irradiated by said light source; and deconvolution means for performing a deconvolution operation in which the image information of the document and the function generated by said generating means are deconvoluted to obtain corrected image information.

6. An image reading unit as claimed in claim 5, wherein said reference image has a white region and a black region connected to the white region.

7. An image reading apparatus as claimed in claim 5, wherein said generating means has differentiation means for differentiating the reference image information in space, a result of the differentiation being used as the function.

8. An image reading apparatus as claimed in claim 5, wherein said deconvolution means comprises:

first fourier-transform means for fourier-transforming the function generated by said generating means;

second fourier-transform means for fourier-transforming the image information which is obtained when the scanning system optically scans the document irradiated by said light source;

dividing means for dividing a result obtained by said second fourier-transform means by a result obtained by said first fourier-transform means; and inverse fourier-transform means for inverse fourier-transforming a result obtained by said dividing means, a result obtained by said inverse fourier-transform means being used as the corrected image information.

* * * * *